United States Patent [19]

Fisli

[11] 4,093,350

[45] June 6, 1978

[54] SYSTEM FOR CENTRIFUGALLY CASTING A THIN FILM PLASTIC IN A REPLICA PROCESS FOR PROVIDING MULTI-FACETED POLYGONAL SCANNERS

[75] Inventor: Tibor Fisli, Los Altos Hills, Calif.

[73] Assignee: Xerox Corporation, Stamford, Conn.

[21] Appl. No.: 687,720

[22] Filed: May 19, 1976

[51] Int. Cl.² .................................................. G02B 5/08
[52] U.S. Cl. ........................................ 350/299; 156/151;
156/233; 264/262; 264/270; 264/272; 264/275;
264/277; 264/279; 427/162; 427/240; 427/401;
428/416; 428/418; 428/542
[58] Field of Search ............... 427/240, 162, 163, 401;
428/418, 457, 416; 75/141; 156/151, 233;
264/261, 262, 263, 270, 275, 271, 272, 279;
350/299, 6, 7, 428, 542

[56] References Cited

U.S. PATENT DOCUMENTS

| | | | |
|---|---|---|---|
| 2,925,570 | 2/1960 | Strock | 264/272 |
| 3,198,657 | 8/1965 | Kimball et al. | 427/240 |
| 3,281,264 | 10/1966 | Cape et al. | 427/162 |
| 3,515,571 | 6/1970 | Levy | 427/162 |
| 3,607,457 | 5/1969 | Hagg et al. | 427/162 |
| 3,730,760 | 5/1973 | Machmiller | 427/240 |
| 3,751,549 | 8/1973 | Hazzard | 264/272 |
| 3,791,876 | 2/1974 | Kroger | 75/141 |
| 3,804,663 | 4/1974 | Clark | 427/240 |
| 3,831,104 | 8/1974 | Lamarre | 264/272 |
| 3,834,789 | 9/1974 | Brudy | 350/299 |
| 3,889,363 | 6/1975 | Davis | 264/272 |
| 3,908,040 | 9/1975 | Dauksys | 427/162 |
| 3,971,873 | 7/1976 | Price | 427/162 |
| 3,984,598 | 10/1976 | Sarazin et al. | 156/151 |

*Primary Examiner*—Ronald H. Smith
*Assistant Examiner*—Janyce A. Bell
*Attorney, Agent, or Firm*—James J. Ralabate; Sheldon F. Raizes; Irving Keschne

[57] ABSTRACT

A thin film plastic is centrifugally cast against an aluminum preform which is placed in a precisely machined polygonal master in a conventional replica process. The plastic which may be an epoxy material is applied to the preform master assembly with centrifugal force causing it to impact in the cavity between the preform and the master to produce a bubble-free layer. Thus, a high speed multifaceted polygonal scanning system is provided which may be employed in a flying spot scanning application.

7 Claims, 3 Drawing Figures

SYSTEM FOR CENTRIFUGALLY CASTING A THIN FILM PLASTIC IN A REPLICA PROCESS FOR PROVIDING MULTI-FACETED POLYGONAL SCANNERS

BACKGROUND OF THE INVENTION

Multi-faceted scanners usually comprising multi-faceted rotating mirrors are employed in well known techniques for erecting optical scanning between a light source and a pohtocell. Typically, a light illuminates a silvered mirror, for example, at an angle of 45° to direct light toward a facet that is reflected from the facet toward the object being scanned. Normally the object reflects this light back along the same path upon a photocell. The duration of the scan corresponds to the time for a facet to pass the light beam along the object being scanned. It is usually preferred that the object path scanned is independent of which facet is then in the light beam path.

In connection with television equipment, it is known to use mirror prisms for image scanning along one dimension, usually for line scanning. Since the advent of television, cameras operating in accordance with the image storage system, the need for such mirror prisms has become greatly increased. Recently television cameras have been designed for operation within the infra-red radiation range, for example, within the range of 2 to 5.5 microns. Television cameras operating within this wave-length require mirrors or similar light deflecting optical means for scanning an image. Usually one means, for instance, a light deflecting mirror, is used for vertical scanning image division. Rotary mirror prisms which are generally prisms composed of several plane mirrors such as glass mirrors are conventionally employed by suitably mounting them on a shaft or other rotary support. These mechanically composed rotary prisms are found to have many disadvantages, both as to their optical characteristics and their mechanical reliability. In particular, they have been found mechanically difficult to mount the several planed mirrors so that they accurately form a polygonal shape of predetermined dimensions. For short optical path lengths, slight misalignment of the facets is found to be of little practical significance. However, when the distance between the scanning mirror and the object being scanned is many feet, slight misalignment of the facets results in the path of scan changing from one facet to the other. Such a result is especially disadvantageous when scanning labels with an encoded stripe arrangement. If there is misalignment of the facets one facet might make a perfect scan of the coded stripes while the next facet would register no scan at all or only scan a few of the stripes.

Moreover, it is difficult to mount the mirrors so that they accurately retain their spatial positions when subjected to the stressed of high speed rotation. The last mentioned mounting problem entails a danger of injury to persons close to the spinning mirror prism which is often unavoidable. Obviously when the mirror prism should disintegrate shrapnel is produced which may cause serious injury to a bystander.

Thus, many methods have been investigated to produce multi-faceted scanners so that the materials from which they are composed would have high modulus to density ratio, low thermal expansion, low Poisson's ratio, good workability and possess the ability to be readily polishable or coatable with a substance which in turn can be polished to produce high quality optical surfaces. Unfortunately, the imposition of these material restrictions result in the requirement of a material which is not readily available. Presently, in view of these material restrictions and limitations, scanners are now being manufactured from glass, stainless steel, beryllium and chromium carbide. The latter two materials are the most widely used since they more nearly meet the requirements of the predicated material limitations. Of these two, beryllium is found to best satisfy the material requirements of the predicated material limitations and consequently is found to perform in a superior fashion when employed. However, the use of beryllium to provide multi-faceted scanners in and of itself results in still other problems among which are exorbitant cost of the material and the extreme difficulty of working the material into the desired configurations. Chromium carbide scanners, although not as expensive as beryllium scanners, possess very high density and therefore require in the overall general construction of the scanner a driver motor and bearings which are much heavier and much more costly to provide.

There is therefore a demonstrated need to provide multi-faceted scanner systems which may be precisely machined, inexpensively, and with great facility than known scanner systems enabling these multi-faceted scanners to be considered for employment in a vast number of applications other than military or development laboratories where the exorbitant costs of currently available scanner systems can only be justified.

It is therefore an object of this invention to provide a novel multi-faceted scanning system devoid of the above noted deficiencies.

It is another object of this invention to provide a novel multi-faceted scanner capable of operation at high rotational speeds.

It is another object of this invention to provide a novel multi-faceted scanner system characterized by precise alignment of the facets.

Another object of this invention is to provide a novel scanning system which achieves precise alignment of the different facets with techniques that are relatively easy to perform.

These and other objects are accomplished, generally speaking, in accordance with the principles of the system of the instant invention, by centrifugally casting a thin film plastic against an aluminum preform which is placed in a precisely machined polygonal master in a conventional replica process. The plastic, which may be for example an epoxy material, is applied to the preform-master assembly with centrifugal force causing it to impact in the cavity between the preform and the master to produce a bubble-free layer.

In prior art replica techniques the production of large optical surfaces has been contemplated so that the application of a thin film plastic to the preform is found to be relatively easy. However, the ease of accessibility unfortunately of these surfaces does not always assure a bubble-free plastic layer. Since the thickness of these layers may be only, for example, approximately 0.005 inches, it can readily be seen that to fill the narrow cavity between the master and the polygon preform without the introduction of air bubbles is either extremely difficult if not impossible.

The master of the system of the instant invention should be shaped such that when it is rotated the centrifugal force exerts pressure on the liquid epoxy and compacts it into a bubble-free layer. The master is rotated only during the filling operation on a vertical axis which provides the most convenient arrangement.

The general premise of the system of the instant invention having been described, the specifics of the system of the instant invention will be more readily understood with reference to the drawings which follow of which:

Figure 1:
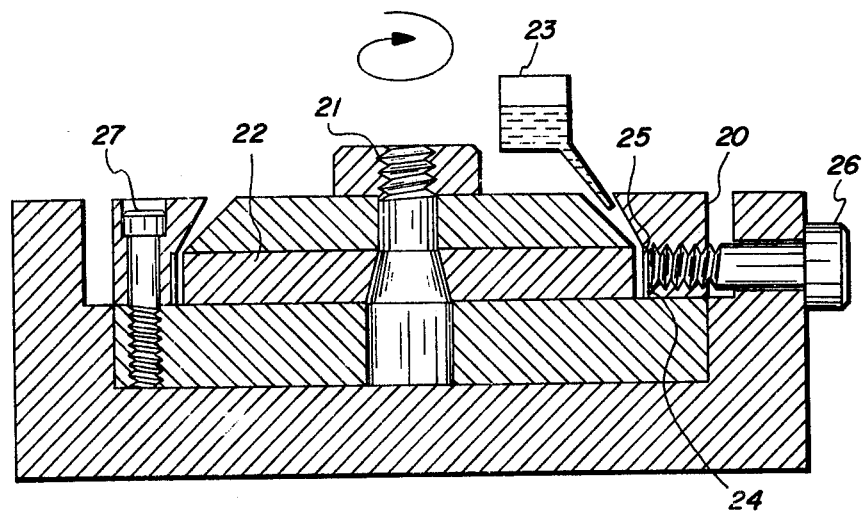
FIGS. 1 and 1A illustrate schematically a system for applying epoxy centrifugally between a preform and a precisely machined multi-facet scanner master.

In FIG. 1 there is seen a master 20 which is concentrically located on a rotational hub 21 carrying a preform 22 which rotates with the master 20. Epoxy 23 is applied to the gap 24 between the preform 22 and the master 20 while the hub 21 rotates the preform 22 thus applying a bubble-free layer 25 between the preform 22 and the master 20. The preform 22 is fabricated of an aluminum alloy as hereinafter designated.

Epoxy 23 is applied while the hub 21 rotates the entire assembly shown until the gap 24 is completely filled with a bubble-free layer 25. The multi-facet scanner thus fabricated is completed when the epoxy 23 is cured and then is removed by breaking the master 20 away at the disengagement points 26, and two others not shown each located at 120° intervals. With a draft-angle of 30° or more 28, the master 20 can be made in one piece since the master 20 can be removed by screws (not shown) using the threaded holes 29 shown in FIG. 1-A. There should be six holes to remove the master 20 and six bolts (not shown) to hold the master 20 to the base plate 30 during operation. If there is no draft-angle 28 (facets are parallel with scanner axis) the master 20 must be made in three parts. During operation they are held in place with precisely located dowel pins and bolts (not shown). When operation is completed, dowels and bolts are removed and the master is being removed radially using screw 26 and two others spaced at 120° intervals not shown.

Figure 2:
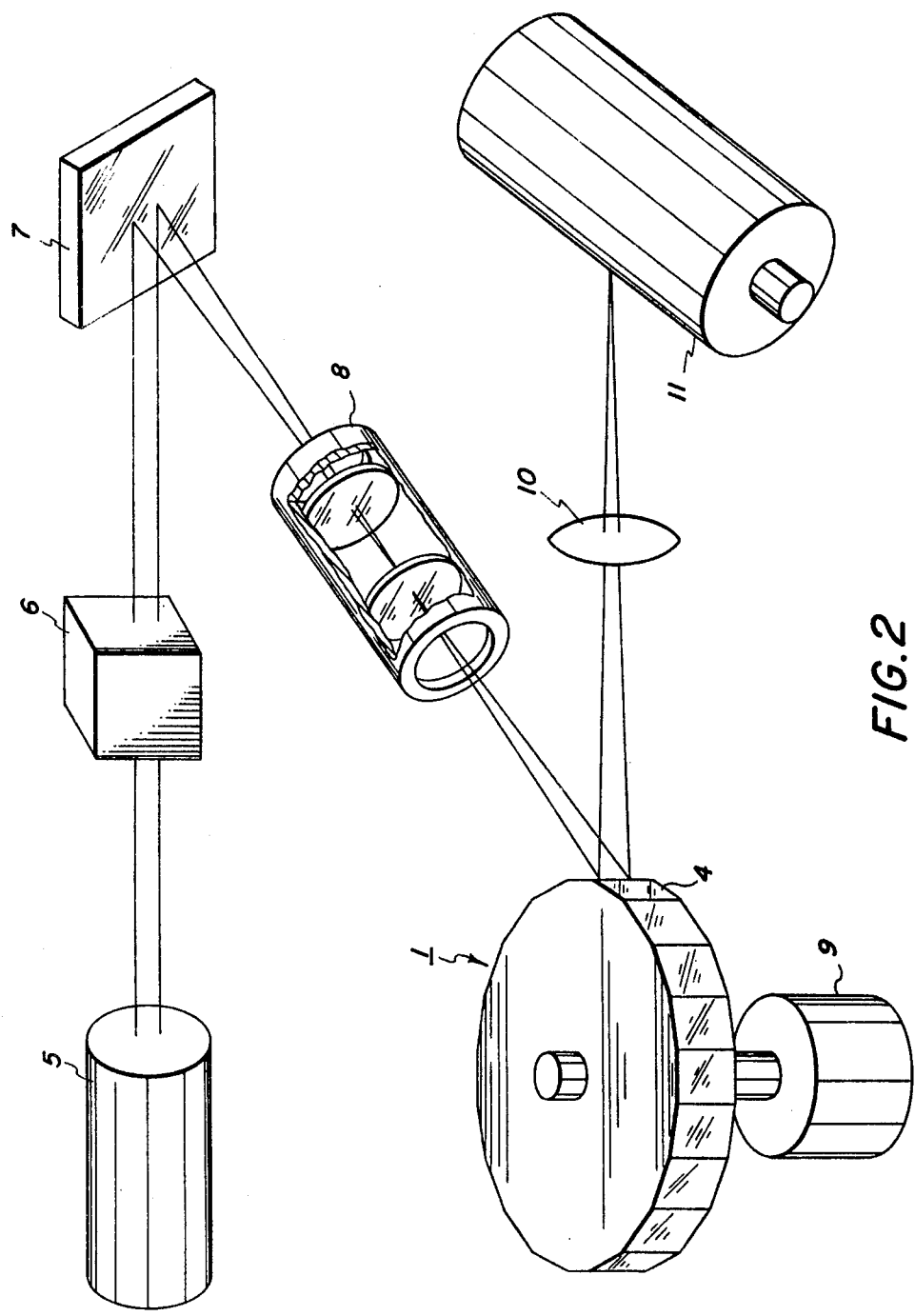
FIG. 2 illustrates schematically a finished multi-facet scanner in a high speed scanning application.

In FIG. 2 there is seen a conventional application for the high speed multi-facet scanner thus provided. A laser 5 emits light through a modulator 6 which is reflected by a mirror 7 to a beam expander 8. The expanded beam impringes on the scanner facets 4 which are rotated at high speed by motor 9. The scanned beam then passes through a focusing lens 10 and is directed to the photoreceptor surface 11.

Typical applications of this system include deflection of a light beam such as laser in such a manner that it produces a "flying spot". When this bright spot is moved across an object-document having high and low density areas by rotation of the scanner, a light detector (placed in the vicinity) provides an electronic signal which is low or non-existent when the spot is in a dark area, and high when the spot is in a light area of the document. This type of scanning system is used in facsimile devices and in optical character readers. Since this system can be used (in conjunction with other hard and software) to decode alpha numerics, it is also known as a "reader". Another system which also uses multi-faceted scanners is the so-called "write" system. The overall arrangement in general is the same except that in the stationary path of the beam (before the scanner) a light switch known as a modulator is used to "write" the inage on a xerographic photoreceptor. The signal going into the modulator can come either from the light detector of the "read" station, or from a character generator which is the case with computer printers.

Any suitable epoxy may be employed in the system of the instant invention. Typical epoxies include EPON 828, among others. Preferred of these are EPON 828 with the addition of 5% by WT DEAPA (Diethylaminopropylamine).

Any suitable master may be employed in the system of the instant invention. Typical masters are produced employing the following technique: facet segments are fabricated from stainless steel or glass and then held in a common frame. The segments are then polished to a high degree of provide the necessary surface quality.

Any suitable aluminum alloy preform of the type recited may be provided for use in the system of the instant invention. Typical techniques for providing such aluminum alloy preforms include: turning the aluminum disk to the desired diameter and thickness on a precision lathe and boring the mounting hole. Employing this method no facet milling is required. The outside diameter of the preform is round. The preferred aluminum alloy is 7075-T651 having the following specifications:

7075-T651 Aluminum Alloy

This alloy is recommended when extra strength and hardness are required. It is used primarily for aircraft and ordinance applications.

| | Nominal Chemical Composition | |
|---|---|---|
| Zinc | 5.6% | |
| Magnesium | 2.5% | |
| Copper | 1.6% | |
| Chromium | 0.3% | |
| Aluminum | Balance (incl. normal impurities) | |
| Typical | Tensile Strength, psi | 83,000 |
| Mechanical | Yield Strength, psi | 73,000 |
| Properties | Elongation, % in 2" | 11 |
| | Shear Strength, psi | 48,000 |
| | Brinell Hardness 10/500 | 150 |
| Typical | Density, Lbs./Cu. In. | 0.101 |
| Physical | Melting Range, approx. ° F | 890–1180 |
| Properties | Electrical Conductivity, | |
| | % IACS at 20° C (68° F) | 33 |
| | Thermal Conductivity, btu | |
| | at 25° C (77° F) | 900 |
| | Average Coefficient of Thermal | |
| | Expansion at 68° to 212° F | 0.0000131 |
| | These typical properties are average values. | |
| Fabricating Performance | | |
| Cold Forming: | Poor | |
| Machining: | Good | |
| Brazing: | Not suitable | |
| Welding: | | |
| Arc, | Poor | |
| Gas, | Poor | |
| Resistance, | Good | |
| | Government and Industry Specifications | |
| | Cold Finished-Rolled | Extruded |
| A.M.S. | 4122C, 4123A | 4154F, 4168A, 4169B |
| A.S.T.M. | B211 | B221 |
| Federal | QQ-A-225-9b(QQ-A-282) | QQ-A-200/11b(QQ-A-277) |
| Military | None | None |
| S.A.E. | AA7075 | AA7075 |

Any suitable rotational mechanism may be employed in the system of the instant invention. Typical such rotational mechanisms include a vertical shaft mounted in a structure supported by bearings, and driven by an electric motor.

The epoxy may be applied employing any suitable conventionally available dispensing system. Typical dispensing systems include a container with adjustable flow mounted in a structure in such a manner that the nozzle is in the feeding groove or the nozzle may be located above the feeding groove in which case the epoxy must be applied before rotation.

The master may be machined and assembled employing any suitable technique. The master is specifically provided so that it may be disassembled from around the epoxy-coated preform. Separation between master and preform may be achieved by another method, namely by quick cooling of the preform after curing. Since during the curing the entire assembly is at the same temperature, a quick cooling of the preform would shrink its diameter faster than the steel of the master. This is due to the fact that the aluminum thermal expansion coefficient is approximately twice that of the steel. This type of separation technique would result with a well-distributed stress in the master.

To further define the specifics of the present invention, the following examples are intended to illustrate and not limit the particulars of the present system. Parts and percentages are by weight unless otherwise indicated.

EXAMPLE I

Figure 1A:
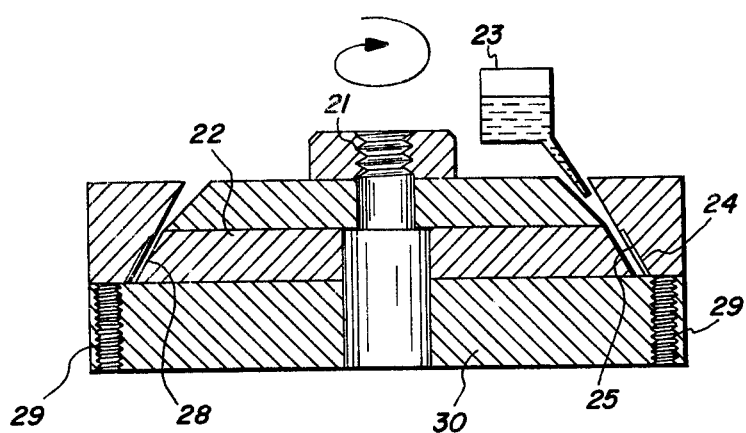

An aluminum alloy preform of the type previously recited is placed on a vertical rotational mechanism which is capable of rotating the preform at 500 rpm. A master previously vacuum coated with 500 to 10000A gold is placed over the hub and around the preform. The master is fabricated of stainless steel having been precisely machined by conventional polishing techniques and is assembled around the preform. A liquid epoxy dispensing system begins to dispense the liquid epoxy in the gap between the rotating preform and master. Dispensing continues with rotation until the gap is filled with a layer which is observed to be bubble-free. The thickness of the layer applied in the gap is found to be 0.005 inches of liquid epoxy. The epoxy is then allowed to cure for 16 hours at 120° F and after that the master is broken away from the preform by either pushing or pulling with screws. If the scanner has draft-angle, the former applies, if there is no draft-angle, the latter is done (see FIG. 1 and 1A). The separation-film of gold deposited earlier on the master stays with the epoxy film due to its higher adhesion to that material. Subsequent finishing coating of 1000A aluminum for enhanced reflectivity and a 200A of silicon monoxide coating complete the fabrication. The multi-facet high speed scanner thus provided is employed in a conventional scanning system as in FIG. 2.

Although the present examples were specific in terms of conditions and materials used, any of the above listed typical materials may be substituted when suitable in the above examples with similar results. In addition to the steps used to carry out the process of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. A process of providing high speed multi-faceted polygonal scanners comprising providing a polygonal master the inner periphery of which comprises a plurality of facet shaped members, providing an aluminum preform positioned concentrically within said master, and centrifugally casting an epoxy against said aluminum preform in a replica process to provide a multi-faceted polygonal scanner said casted epoxy conforming to the shape of said faceted master.

2. The process as defined in claim 1 wherein the master is rotated during the casting operation on a vertical axis.

3. The process as defined in claim 1 wherein said master is coated on its inner periphery with gold which is adhesively separated onto the epoxy surface.

4. A process of providing high speed multi-faceted polygonal scanners comprising the steps of providing a polygonal master the inner periphery of which comprises a plurality of facet shaped members, providing a preform comprising aluminum positioned concentrically within said master, rotating said polygonal master and preform, dispensing an epoxy into the gap between said inner periphery of said master and said preform during the rotation thereof, said epoxy being centrifugally casted against said preform in a replica process and conforming to the shape of said faceted master, said dispensing continuing until the gap is filled with a layer of epoxy which is substantially bubble free, curing the epoxy and thereafter separating the master from the preform, the coated preform forming a multi-faceted polygonal scanner.

5. The process as defined in Claim 4 wherein the facet shaped members of said master are coated with gold, the layer of gold being adhesively separated onto the surface of the epoxy formed on said preform.

6. The process as defined in claim 5 wherein the gold layer separated onto said epoxy surface corresponds to the facet shaped members on the inner periphery of said master.

7. A multi-faceted polygonal scanner produced in accordance with the process as defined in claim 1.

* * * * *